Figure 1:
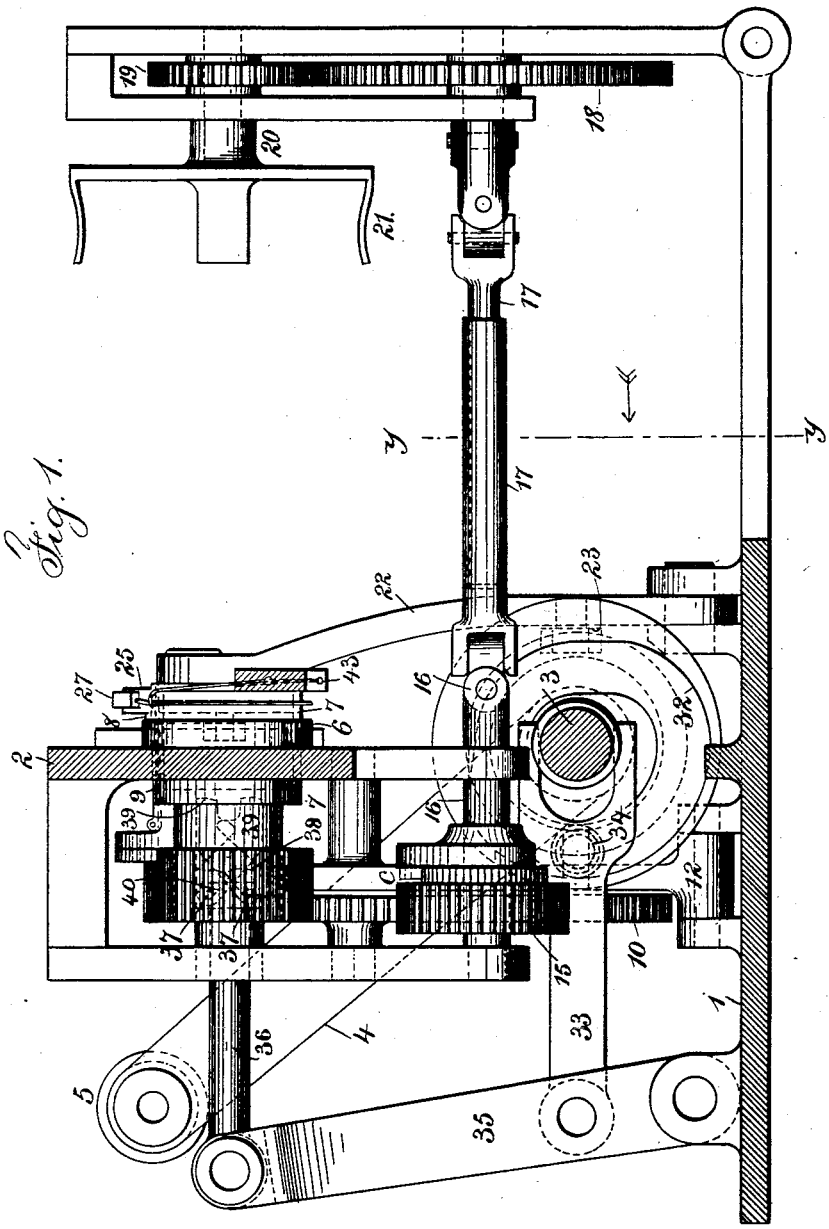

(No Model.) 6 Sheets—Sheet 1.

J. KARLSSON.
MACHINE FOR WIRING CORKED BOTTLES.

No. 590,496. Patented Sept. 21, 1897.

Witnesses
Chas. H. Smith
J. Staib

Inventor
Johannes Karlsson
per Lemuel W. Serrell
Atty.

(No Model.) 6 Sheets—Sheet 2.
J. KARLSSON.
MACHINE FOR WIRING CORKED BOTTLES.
No. 590,496. Patented Sept. 21, 1897.
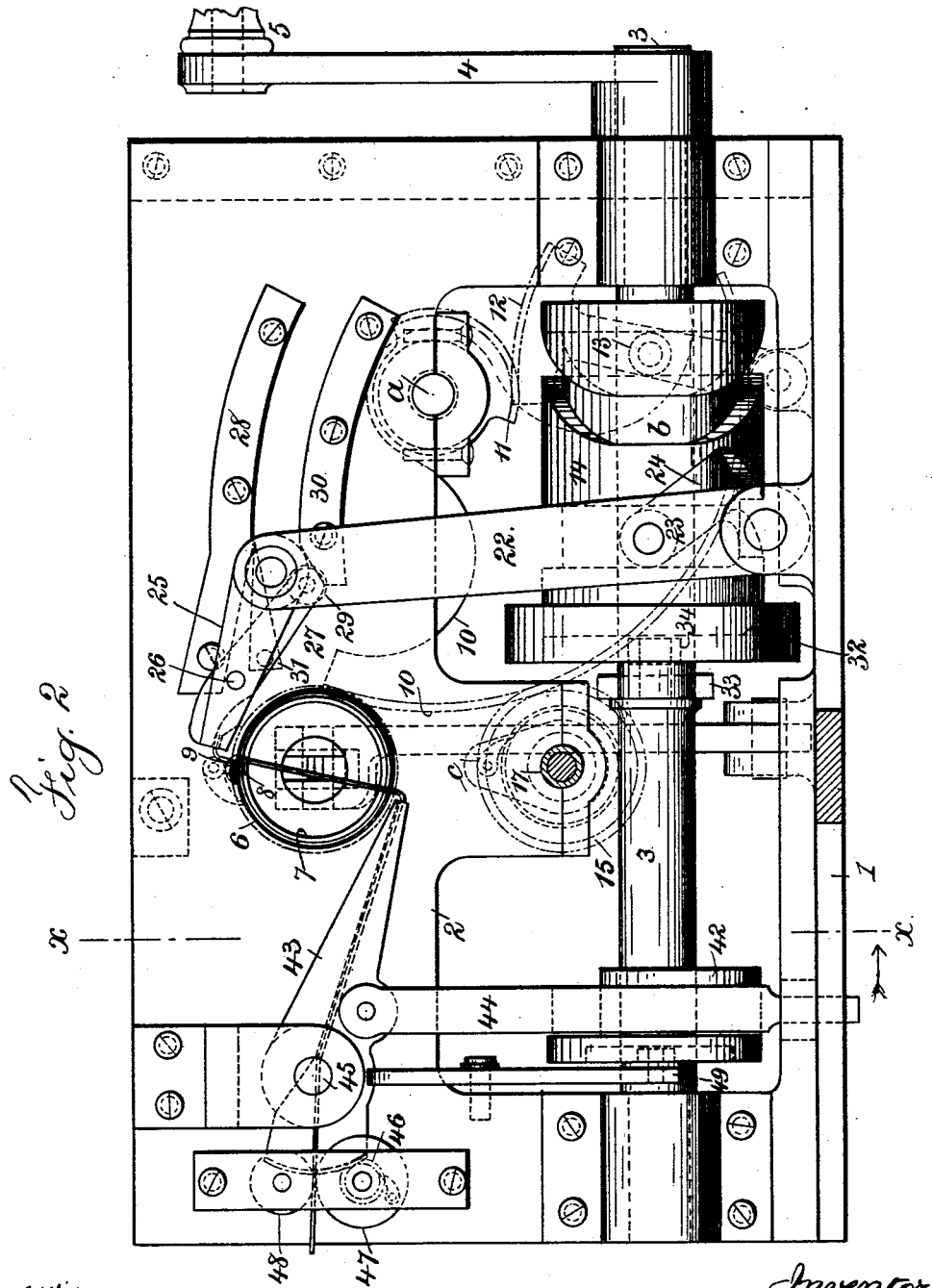
Witnesses
Chas. H. Smith
J. Staib
Inventor
Johannes Karlsson
   by Lemuel W. Serrell
        Atty

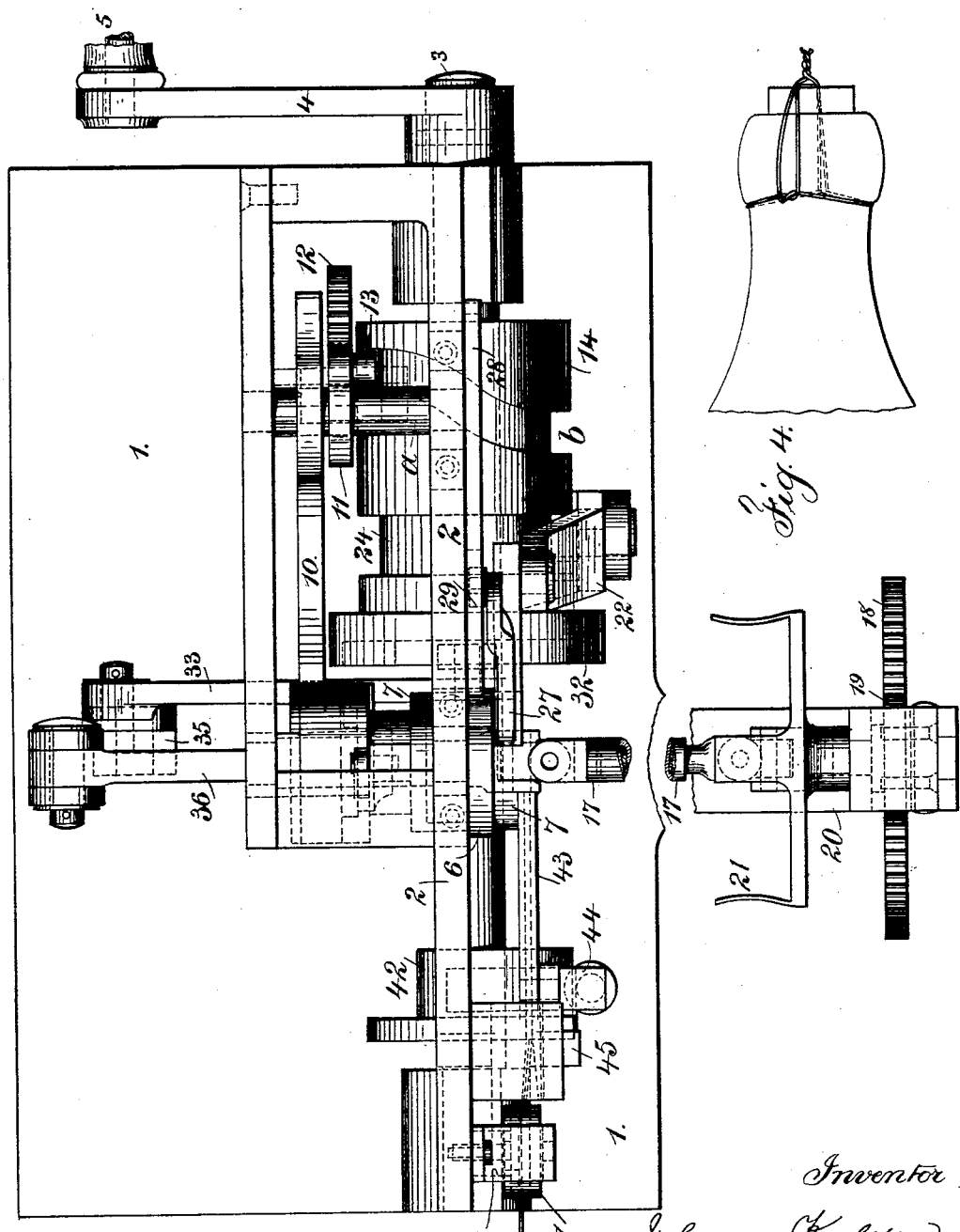

(No Model.) 6 Sheets—Sheet 4.
J. KARLSSON.
MACHINE FOR WIRING CORKED BOTTLES.
No. 590,496. Patented Sept. 21, 1897.
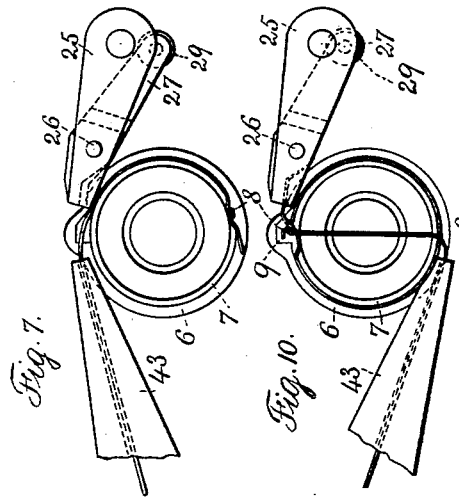
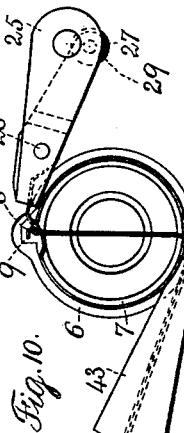
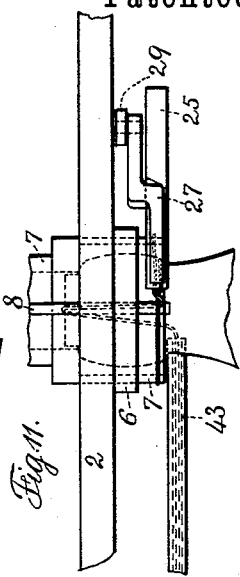
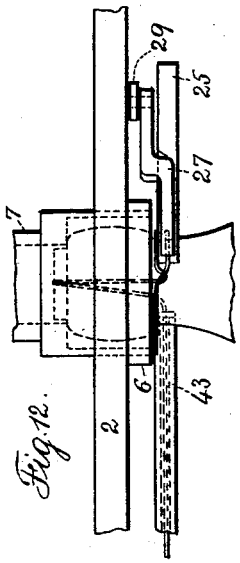
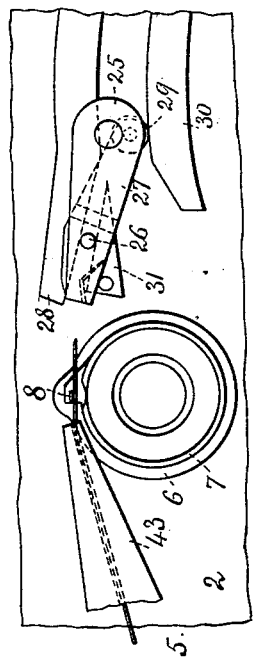
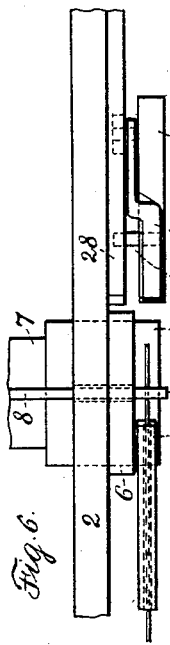
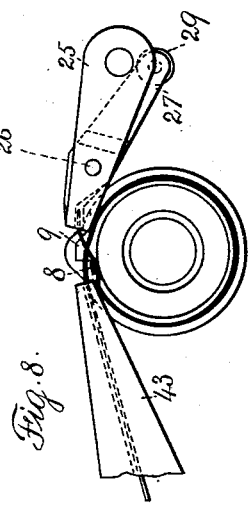
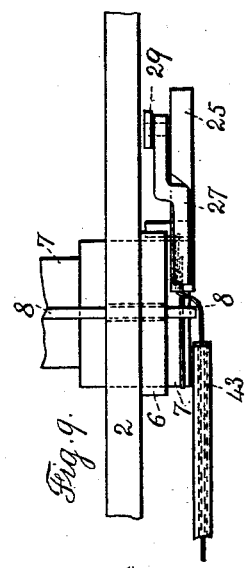
Witnesses:
G. Staib
Geo. T. Pinckney
Inventor:
Johannes Karlsson
by Lemuel W. Serrell
Atty (No Model.) 6 Sheets—Sheet 5.
J. KARLSSON.
MACHINE FOR WIRING CORKED BOTTLES.
No. 590,496. Patented Sept. 21, 1897.
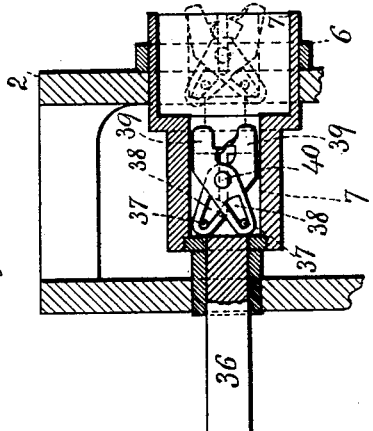
Fig. 16.
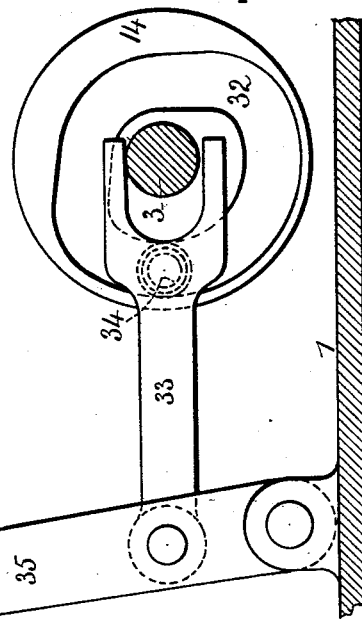
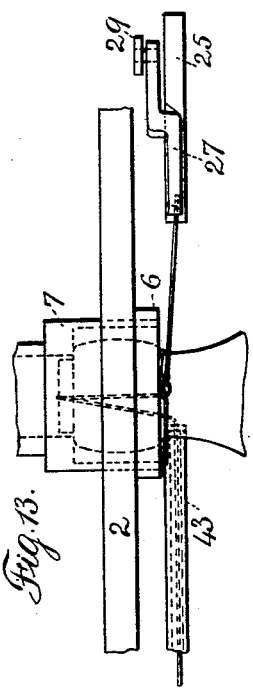
Fig. 13.
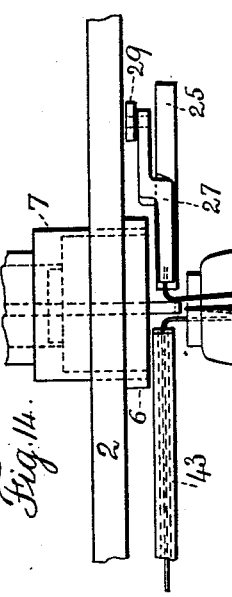
Fig. 14.
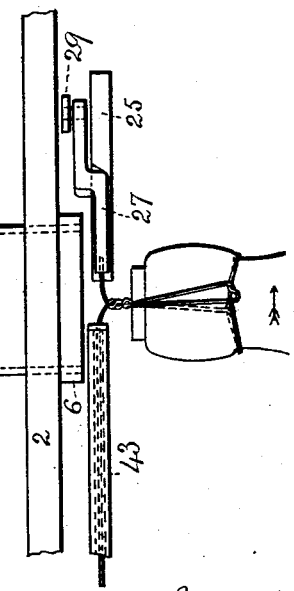
Fig. 15.
Witnesses:
J. Staib
Geo. T. Pinckney
Inventor
Johannes Karlsson
by Lemuel W. Serrell
Atty (No Model.) 6 Sheets—Sheet 6.
J. KARLSSON.
MACHINE FOR WIRING CORKED BOTTLES.
No. 590,496. Patented Sept. 21, 1897.
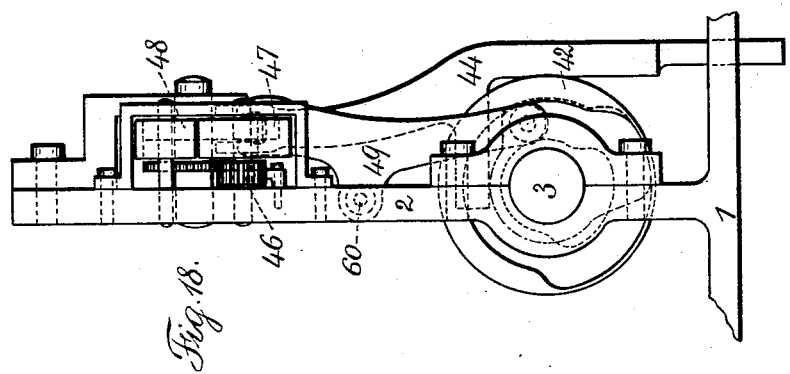
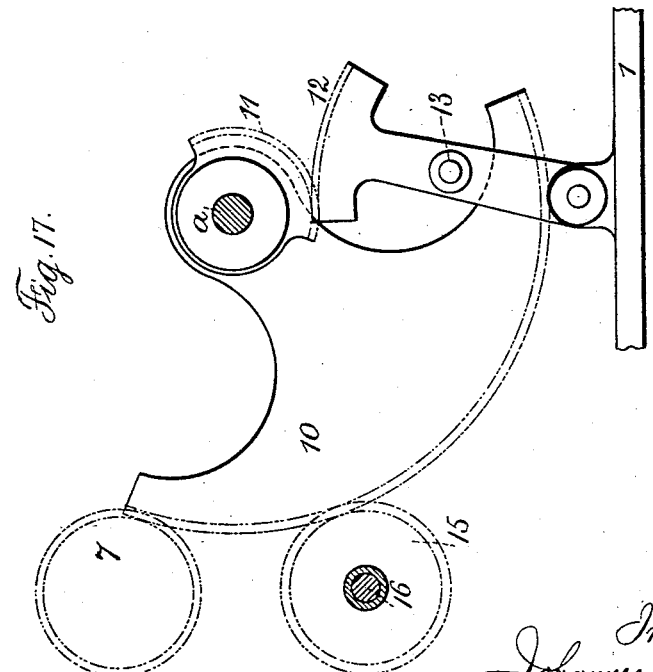
Witnesses:
J. Staib
Geo. T. Pinckney
Inventor:
Johannes Karlsson
by Lemuel W. Serrell
Atty.

UNITED STATES PATENT OFFICE.

JOHANNES KARLSSON, OF STOCKHOLM, SWEDEN, ASSIGNOR OF ONE-HALF TO VICTOR LÖNNQVIST, OF SAME PLACE.

MACHINE FOR WIRING CORKED BOTTLES.

SPECIFICATION forming part of Letters Patent No. 590,496, dated September 21, 1897.

Application filed March 11, 1895. Serial No. 541,350. (No model.)

*To all whom it may concern:*

Be it known that I, JOHANNES KARLSSON, a subject of the King of Sweden and Norway, residing at Stockholm, Sweden, have invented an Improved Machine for Wiring Corked Bottles, of which the following is a specification.

This invention relates to a machine for wiring corked bottles, which wiring is performed by a single turn of a handle. By this machine a considerable saving of time and wire is realized, as the loss resulting from the necessity of cutting off superfluous wire ends is avoided.

The machine is represented on the annexed drawings.

Figure 1 shows an elevation and transverse section at the line $xx$, Fig. 2. Fig. 2 is an elevation and section at the line $yy$, Fig. 1; and Fig. 3 is a plan. Fig. 4 represents the neck of a wired bottle, showing the mode in which the wire has been applied by means of the machine in question; and Figs. 5 to 18, inclusive, represent details of the position and construction of the parts and steps in the operation of wiring the bottle, hereinafter more particularly described.

The machine is provided with a base-plate 1 and a longitudinal plate standard or wall 2, and the operating parts receive their motion from a shaft 3, in bearings secured to said wall, and that is provided with a crank 4 and handle 5, so that said shaft can be turned by hand. In the upper part of the plate-standard 2 there is a circular opening having a metal bushing 6, and in this opening there is placed a sliding cylindrical socket 7, with a spring-pin 8 projecting slightly beyond the outer edge of the socket and in the position shown in the drawings, pressing against the upper edge of a recess 9, provided in the bushing 6, above the socket 7. The socket 7 is rotated by a toothed sector 10, actuated by the shaft 3 by means of a toothed sector 11 upon the axis $a$ of the sector 10 meshing into another toothed sector 12 upon a rocking arm which in its turn is moved forward and back by a roller 13 fixed thereon and located in the groove $b$ of the cam 14, fixed upon the shaft 3.

The sector 10, as shown in Figs. 2 and 17, meshes with two toothed wheels, the lower one 15 being adapted to cause the rotation of the bottle and the upper one adapted to cause the rotation of the socket 7 to operate the securing-wire. The lower wheel 15 and its adjacent ratchet-wheel are loose upon the axis 16, and the coupler-head, carrying the pawl $c$, is fast upon said axis. The axis 16 has bearings in the frame and is coupled to the telescoping shaft 17, which in turn is connected to the gear-wheels 18 19, and when these parts are actuated a rotary movement is imparted to the spring-armed support 21 for the bottle, which support is fixed on a movable arm 20. The upper toothed wheel is loose on the sleeve of the socket 7, while secured to said socket-sleeve is a head carrying a pawl. (See Figs. 1 and 2.) These pawls are placed alternately, as shown in Figs. 1 and 2, so as to engage the toothed wheels in one direction and permit them to turn unopposed in the other direction. Thus when the sector 10 is moved upward the upper wheel turns free and the socket 7 is undisturbed, but the lower ratchet and pawl are engaged to rotate the bottle by the movement of the parts 17, 18, 19, 20, and 21. When the sector 10 is moved downward, the lower toothed wheel turns free and the bottle is undisturbed, but the upper ratchet and pawls are engaged and rotate the socket 7 and carry the wire around the socket, as shown in Figs. 5 to 9, inclusive.

The lever 22 is actuated by a roller located in a groove 24 in the cam 14. The said lever 22 has at its upper end a pivoted jaw 25, which by means of a pin 26 supports a jaw 27, movable thereon, and the jaws 25 27 are arranged in the form of tongs to grasp and hold one end of the binding-wire when said jaws are closed. When the arm 22 moves away from the socket 7, the prolonged pin 26 is moved along the guide 28, and a roller 29, fixed on the lower end of the jaw 27, at the same time rides up an incline on the guide 30. As the arm goes still farther back the pin 26 passes by a spring-actuated switch-tongue 31 and simultaneously the roller 29 is moved along the guide 30. The tongs are now closed. When the arm 22 advances toward the socket 7, the pin 26 passes along the lower edge of or underruns the switch-tongue 31 and the tongs are opened again, and as the pin 26 passes beyond the head of the switch-tongue 31 to the primary position the tongs are again closed on the wire.

In one end face of the cam 14 on the shaft 3 there is a groove 32, guiding a roller 34, connected with the forked rod 33. By this means a forward-and-backward motion is given to the lever 35, pivotally connected with the rod 33, and thus a motion is communicated to the piston 36. One end of the piston passes into the socket 7 and is made with an enlargement that is slotted transversely, the slot being vertical. (See Fig. 2.) The parts 39, forming a pair of shears with cutting-jaws, are pivoted together and have mortises 38, through which pass pins 37, extending across the slot in the enlarged end of the piston, and the sides of the piston are slotted for the ends of the pin 40. In the operation of these parts the piston is moved forward from the position Fig. 16 and the shears are projected beyond their closed location into the large part of the socket 7, with their advancing ends against the cork of the bottle. This occurs slightly after the piston commences its movement. The final movement of the piston causes its slots to move along over the ends of the pin 40 and its pins 37 to move along the mortises 38 of the jaws and open the same, so that the cutting-jaws are brought at the respective sides of the twist of sealing-wire forward of the cork. In this position (shown in dotted lines) the rear ends of the jaws are expanded beyond the limits of the back opening in the socket 7, so that the backward movement of the piston causes the rear ends of the jaws to strike the face of the socket, and as the piston 36 draws back the pins 37 in the mortises 38 close the jaws and sever the sealing-wires just forward of the twist, and the jaws in this movement compact, so as to be drawn into the smaller part of the socket preparatory to repeating the operations.

The shaft 3 is provided with a cam 42, acting upon a projecting portion of the rod 44, carrying the rocking arm 43. This arm 43 has an opening through which the binding-wire passes, and it is pivoted on a pin 45, fixed in the plate-standard 2, and it is provided with a toothed sector meshing with a toothed wheel 46, coupled with the roller 47, which, together with the roller 48, feeds the wire. The arm 43 is moved toward and away from the plate-standard 2 by means of the lever 49, pivoted at 60 to said plate-standard and carrying a roller operating in an eccentric groove in the cam 42.

The grooves provided in the cams on the shaft 3 are exactly adjusted and disposed in relation to each other in order to effect an accurate coöperation of the above-mentioned parts.

The working of the machine is as follows: A wire passing through the arm 43 is moved forward under the pin 8, Figs. 5 and 6, and the pin 8 is moved down upon the wire, holding the same in the surface recess of the socket 7, which socket is revolved, as shown in Fig. 7, to wind the wire around its periphery. When this movement is completed, the free end of the wire passes in front of the encircling wire and into the jaws of the open tongs 25 27 and is nipped by the tongs closing. This position is shown in Fig. 8. The arm 43, carrying the wire, is now moved outward and downward to the position shown in Fig. 10. A corked bottle is now introduced into the spring-arms of the support 21, and with its cork against the wire crossing the socket 7 it is pressed forward. The wire will thus be forced with the cork into the socket to the position Fig. 11, and the further movement pushes the socket 7 back, stripping the encircling wire off and delivering same around the neck of the bottle, as shown in Fig. 12. The tongs 25 27 are now moved off, as shown in Fig. 13, to tighten the wire around the neck of the bottle. In the the next movement the bottle and cork are pushed out of the socket 7 by the action of the cam 32, rod 33, lever 35, and piston 36, with the end of the shears 39 bearing against the cork. Just before the bottle is pushed fully back the shears 39 pass out of their confined position in the socket 7 and expand into the position shown by dotted lines in Fig. 16. This expansion is effected by the slotted piston-head moving forward over the pivot-pin of the shears and by its pins 37 expanding the shears at the mortises 38 and opening the shears. Simultaneous with this backward movement of the bottle and cork the tongs 25 27 move forward, still holding the end of the wire, and the parts are in the position shown in Fig. 14, the switch 31 meanwhile being held open in any desired manner. In the next movement the bottle is rotated by means of the cog-wheel 15 and cog-sector 10 and the wire twisted over the end of the cork, as shown in Fig. 15. In the next movement the piston 36 is drawn back, the shears 39 are closed, and the wires just forward of the twist are severed and the parts returned to the position shown in full lines, Fig. 16, preparatory to having the operations repeated after the bottle has been removed.

I claim as my invention—

1. The combination in a machine for applying wire to a corked bottle, of a socket, means for supplying and holding one end of the wire and for winding the wire around the socket, means for carrying the wire centrally across the end of the socket, means for slipping the coil of wire off from the socket onto the bottle-neck and for pulling up and tightening the wire around said neck, means for forcing the cork and bottle-neck with the wire thereon out of the socket, and means for twisting the ends of the wires together over the cork, substantially as specified.

2. The combination in a machine for applying wire to a corked bottle, of a socket, means for rotating the same, means for supplying the wire and connecting one end of a wire to the socket so that the wire may be wound around the socket by the rotation of the same, means for carrying the wire across the end of the socket, means for holding and rotating the bottle after the cork and bottle-neck have been inserted into the socket, means for shedding the coil of wire from around the socket upon the neck of the bottle, and means for drawing up the wire and for twisting the ends together and cutting off the wire, substantially as set forth.

3. The combination with the sliding cylindrical socket and means for supporting the socket and rotating it in its support, of an arm for carrying the wire, means for holding the wire to the socket while the socket is being rotated, means for moving the arm to carry the wire across the socket, means for supporting and rotating the bottle after the cork and neck have been thrust into the socket, means for drawing up the wire around the neck of the bottle and for holding the wire while the parts thereof are being twisted together, and means for cutting off the wire and restoring the parts to their normal position, substantially as set forth.

4. A tubular sliding socket 7 and means for supporting and rotating the same in its support, a spring upon the socket for engaging the wire previous to the rotation of the socket, means for supplying the wire, and a pair of pincers and means for moving the same to draw up the wire around the neck of the bottle after the coil of wire has been shed off the socket upon the neck of the bottle, substantially as set forth.

5. The combination with the socket and means for supporting and rotating the same and for supplying the wire, of a piston movable in the socket for driving out the bottle, and a pair of shears within the socket and means for opening and closing the same and cutting off the wire after it has been twisted, substantially as set forth.

6. The combination with the socket and means for supplying the wire, of a lever 22 and tongs or jaws 25, and 27, and guides for actuating the tongs or jaws for drawing up the wire around the neck of the bottle and carrying the wire over the cork for the two parts to be twisted together, and means for holding and rotating the bottle to twist the wire, substantially as set forth.

7. The combination in a machine for supplying wire to corked bottles, of an arm through which the wire is supplied, a socket around which a coil of wire is applied and led across the socket, a bar and tongs for grasping the wire, means for receiving and holding the bottle, a crank and connecting mechanism therefrom for rotating the bottle, for moving the wire carrying-arm and pincers, and for actuating the socket, substantially as set forth.

In testimony whereof I have signed my name to this specification in the presence of two subscribing witnesses.

JOHANNES KARLSSON.

Witnesses:
CARL P. GERELL,
CARL FRANC.